Figure 1:
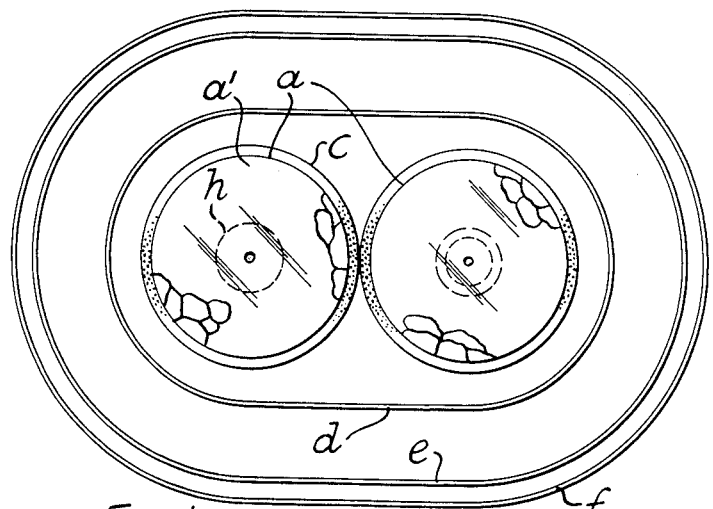

Jan. 26, 1965     C. J. HEALEY     3,166,973
ABSTRACT COLOR DISPLAY APPARATUS AND METHOD
Filed April 6, 1961     3 Sheets-Sheet 1

Inventor:
Colin John Healey
BY Baldwin & Wight
Attorneys

Jan. 26, 1965 C. J. HEALEY 3,166,973
ABSTRACT COLOR DISPLAY APPARATUS AND METHOD
Filed April 6, 1961 3 Sheets-Sheet 3

Inventor:
Colin John Healey
BY Baldwin & Wright
Attorneys

# United States Patent Office 3,166,973
Patented Jan. 26, 1965

3,166,973
ABSTRACT COLOR DISPLAY APPARATUS
AND METHOD
Colin John Healey, West Malling, Kent, England, assignor
to The Willesden Paper and Canvas Works Limited,
London, England, a corporation of England
Filed Apr. 6, 1961, Ser. No. 101,177
Claims priority, application Great Britain, Apr. 12, 1960,
13,101/60
5 Claims. (Cl. 88—24)

The present invention concerns the production of versatile chromatic displays and special decorative effects. In particular the invention provides colour display effects developed by movement of illuminated areas on a surface, of such a character that the method by which the effect is produced is not readily apparent to an observer. The invention also envisages effects produced by temporary cessation of such movement and also methods of reproducing these effects such as by photography.

Effects of a similar general type have been produced hitherto, for instance on cinema screens, or on advertising signs, by means of rotary devices in which the cycle of repetition is rather short and liable to become irritating to the observer. In another known device, coloured zones of light are caused to move across a screen within limits predetermined by masking, whereby the illusion of translatory movement is given to fixed features on the screen.

An object of the present invention is to obtain apparatus for projecting, onto screens or other surfaces, a vivid multi-coloured design which continually merges or dissolves or otherwise changes by degrees into a fresh design.

A further object of the invention is to provide an apparatus and method for producing such a design with the minimum sense of repetition and which gives the observer the maximum sense of peaceful contemplation.

A still further object of the invention is to provide reproductions, such as still pictures, of the aforesaid designs produced according to the invention.

According to the present invention apparatus for producing versatile chromatic displays comprises at least one multi-coloured light source, means for projecting a confused image or images thereof onto a viewing surface, said source and/or said projecting means being adapted to rotate and located with respect to the viewing surface in positions which avoid the production of a focussed image of the light source.

According to one preferred form of the present invention apparatus for producing chromatic display effects comprises at least one multi-coloured light source formed by one or more electric lamps each within a rotary multi-coloured transparent enclosure; and an interfering screen as hereinafter described, whereby light transmitted through the interfering screen produces a chromatic display when incident upon a translucent or external opaque viewing surface.

The interfering screen is a generally transparent surface interrupted in such a manner as to produce a confused image of transmitted light. Thus the interfering screen may be a chequered, graticular, maculate or striated surface or a non-planar surface, on a transparent sheet. The interfering screen preferably bears a pattern of uniformly spaced dots or lines.

The multi-coloured transparent enclosure forming part of the light source is preferably in the form of a cylinder, although discs may find application. Each bears on its surface arbitrarily or randomly arranged areas of different colours, preferably having no particular shape, painted on, or formed of separately bonded pieces of coloured materials. The multi-coloured transparent enclosure and the interfering screen can be readily produced, for example, on transparent plastic materials by means of coloured lacquers, in the case of the interfering screen, preferably black. The screens may alternatively be formed with prismatic transparent sheet material adapted to produce spectra.

The multi-coloured light source may on the other hand include one or more clusters of tiny electric lamps, preferably individually and differently coloured, such as those known as pea bulbs. These may be used with or without a rotary enclosure. The multi-coloured light source may also comprise one or more prisms adapted to receive sunlight and transmit dispersed sunlight.

According to another preferred embodiment of the invention, apparatus for producing chromatic display effects comprises at least one multi-coloured light source of any of the aforesaid types, together with a plurality of lenses or other refracting bodies mounted to rotate on a circumferential track across a path of light between the source and a viewing surface. The lenses are mounted so as to avoid producing any focused image of the light source, and the spaces intervening between adjacent lenses are preferably masked to prevent light reaching a viewing surface without passing through lenses. The lenses may, for instance, be mounted on edge near the circumference of a rotary turntable, in the plane of light passing from the source towards the viewing surface.

According to a third preferred embodiment of the invention, apparatus for producing chromatic display effects comprises at least one multi-coloured light source of the aforesaid types, and projecting means including one or more unfocused mirrors mounted in a path of light between the rotating source and the viewing surface or between the interfering screen in the first aforesaid embodiment and the viewing surface. Effects are produced in this manner resembling waving sheets of woven cloth, or patterns resembling strongly illuminated billowing smoke. This embodiment is particularly suitable for producing large scale displays involving projection over substantial distances. The mirrors used may be flat, concave, parabolic, corrugated, or with otherwise distorted surfaces or, for instance, in the form of small pieces backed by flexible fabric. It may also be of advantage, especially in relatively large scale displays, to make use of a body of water as a reflecting medium.

Particularly interesting effects may be obtained by a combination of two of the embodiments hereinbefore described. For instance a multi-coloured light source may be mounted to rotate between a concave mirror and a lense so that areas of colour result on a viewing surface by virtue of light passing through the lens, light reflected by the mirror and possibly also by virtue of light reflected from the mirror through the lens.

In the foregoing embodiments of the invention it is preferable to employ more than one rotating element. Thus, for instance, there may be used two or more rotary multi-coloured enclosures for the light source, or there may be used two or more turntables carrying lenses associated with one or more multi-coloured light sources, which may themselves be of rotary form. In general an increase in the number of elements between which there is relative rotation increases the pleasing nature of the display produced but an undue multiplication of rotating elements may simply produce too much confusion thereby reducing interest in the display.

The viewing surface or screen upon which the display is observed may take any form. It may, for instance, be the wall of a room, the screen of a cinema, a lamp shade, a television screen, a piece of jewellery or an advertising sign. Units for indoor exhibition will generally possess a translucent screen mounted in a fixed relationship to the light source and to the projecting means. The display can likewise be produced on large surfaces such as outdoor walls, foliage of trees or clouds.

There is produced upon the screen or other viewing surface a pattern made up of coloured zones which are constantly changing shape and constantly merging or dissolving into one another. The image of the primary light source itself is never seen in focused form, however. The effect is well illustrated by the use of colours in the red and yellow part of the spectrum, whereupon the chromatic display can be arranged to resemble burning flames. Devices which include a concave mirror are specially suited to this purpose. The effect of the interfering screen when used is that the areas of colour which appear on the viewing surface, do not appear to move across that surface in any particular direction relative to the source, but appear to be in movement and dissolving among themselves, with a superimposed rippling or oscillating effect.

Further special effects may be obtained by means of supplementary images on the viewing surface. These are introduced by means of intervening pictures, silhouettes, models or moving objects mounted between the projecting means and the viewing surface. Particularly interesting effects may be obtained by mounting such intervening objects so as to float on a body of water in a random manner. The observer sees such supplementary images on the viewing surface not only in silhouette form but also in apparent movement with the chromatic effect characteristic of the present invention superimposed. Thus by an appropriate choice of colours and the use of a silhouette shaped as a tree, there can be produced the effect of waving branches and leaves. Sunset effects can be produced by employing silhouettes representing clouds which then appear to be in slow movement.

The relative distances employed between the elements of apparatus constructed according to the invention naturally vary according to the scope of the display required. For a source having a power of from 60 to 100 watts it is preferable that the viewing surface be not more than, say, 6 inches to 1 foot from the source of light unless some element in the unit is capable of concentrating light. The distance between an intervening picture inserted for silhouette production, and the viewing surface should preferably be from about 3/16 inch to 1 inch and the distance of the interfering screen from the viewing screen should then be 2 to 3 inches, the interfering screen being from 1 to 3 inches away from the light source.

The various screens involved according to the invention may be of any shape whatsoever and the surfaces thereof need not necessarily be flat; for instance, the interfering screen may be made of a transparent material having a non-planar surface such as hammered glass.

The light source preferably includes electric lamps of the tungsten-filament clear glass type, especially these providing a point source. Particularly useful effects are produced by employing a cluster of pea bulbs. It is possible to adapt the apparatus so as to employ sunlight, ultra violet or other suitable light, which may co-operate with fluorescent colouring materials.

Various modifications may be made to the apparatus hereinbefore described without departing from the principle employed according to the invention. Thus, for example, the rotary movement may be energised by electric motors, convection currents from the heat of a lamp or by clockwork. In connection with the last mentioned possibility, the viewing surface may be a clock face.

The apparatus may be incorporated into a projection television receiver in such a way as to modify scenes as such landscapes or it may be incorporated into advertising, ornamental or architectural exhibits, exemplified by reproductions of stained glass windows. Similar apparatus may suitably be adapted for use in electric fires having a section intended to resemble a burning coal fire.

It is preferred that the rotary movement should not be too rapid and speeds of two revolutions per minute or less are desirable.

The production of the colour effects characteristic of apparatus according to the present invention involves means for projecting a confused image of a multicoloured light source. A number of such means have been described, which rely upon the use of refracting or reflecting media formed with focussing properties such as lenses and curved mirrors, or on the use of so-called interfering screens, which owe their behaviour as employed herein, to their property of apparently redistributing transmitted light. By a confused image there is meant not only a distorted image or an image which is out of focus, but an image which by virtue of the relationship between the components of the optical system, presents a confused impression not only of the appearance of the light source, but also of its nature. Thus, for example, a source comprising an illuminated sheet having areas of various colours, rotating as a whole, may be rendered on the screen as a collection of various coloured areas moving and dissolving among themselves but collectively apparently remaining more or less stationary as a whole. These effects are due at least in part to an appropriate choice of relative distances between the light source, the viewing surface, and the focussing or interfering medium used. These distances can be ascertained readily by experiment to give the required illusion.

Figure 2:
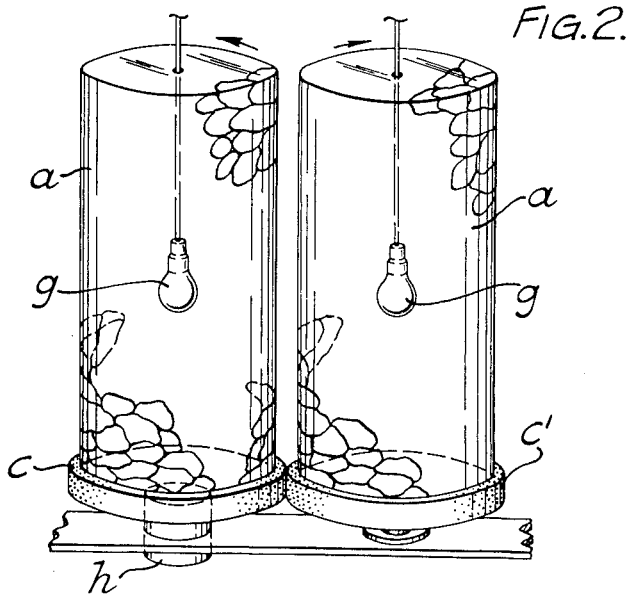
Figure 3:
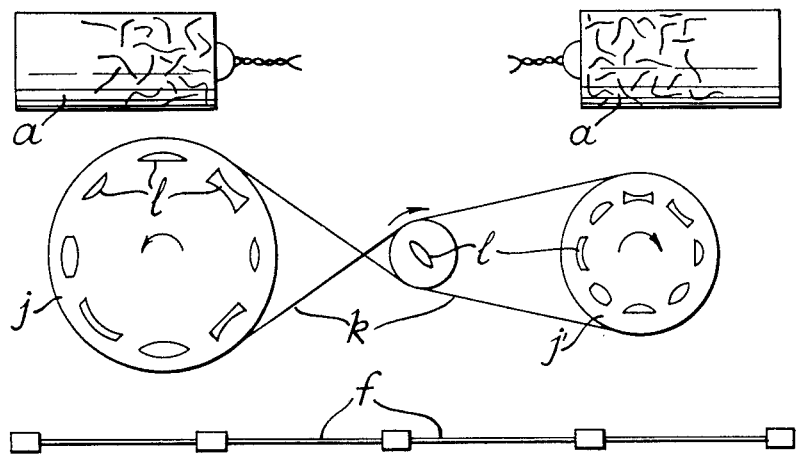
Figure 4:
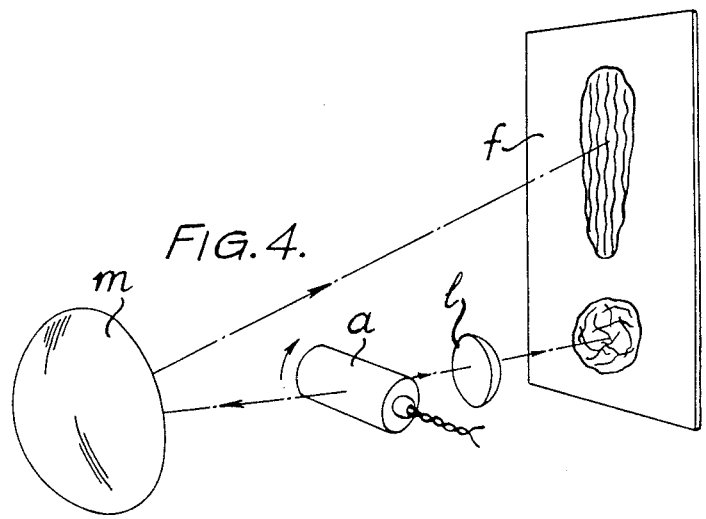
Figure 5:
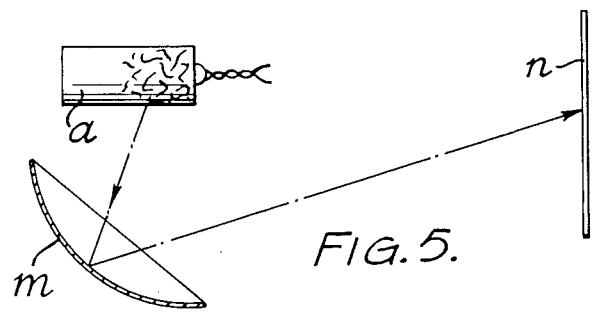
Figure 6:
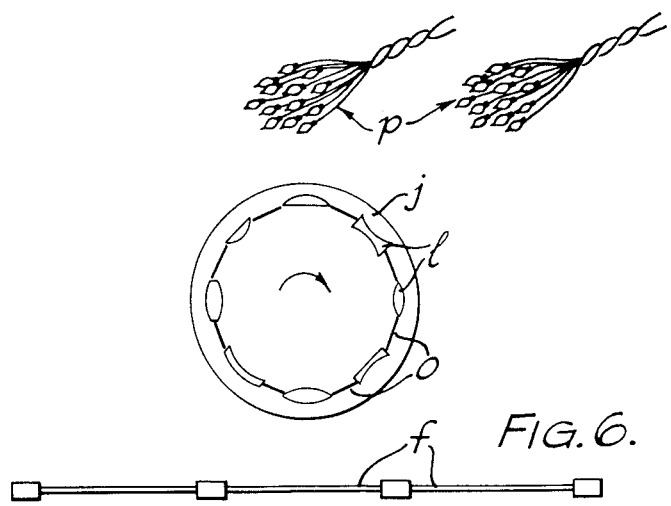

The invention will now be described by way of illustration with reference to the accompanying drawings, in which FIGURE 1 represents a plan view of a first device according to the invention, FIGURE 2 is a perspective view of internal parts of FIGURE 1, FIGURE 3 is a plan view of a second device according to the invention, FIGURE 4 is a perspective view of a third device according to the invention, FIGURE 5 is a diagrammatic representation of a fourth device according to the invention and FIGURE 6 is a plan view of a fifth device according to the invention.

In the embodiment illustrated in FIGURES 1 and 2 two undiffused incandescent light sources such as 100-watt clear bulbs $g$ are surrounded by transparent cylinders $a$ with end faces $a'$ which bear on their surfaces randomly arranged areas of variegated colours. An electric motor $h$ is adapted to rotate one of the cylinders $a$ on its axis. Said cylinder possesses at one end a driving band $c$ made of foamed rubber so as to co-operate with a similar driving band $c'$ on the adjacent cylinder to rotate the latter. Both cylinders are mounted on suitable axes and supported on a frame or platform. The rotating cylinders $a$ together with the lamps $g$ constitute two multi-coloured light sources. These are surrounded by an interfering screen $d$ and an optional picture screen $e$ shown diagrammatically. The interfering screen carries a pattern of opaque spots more or less uniformly distributed, being about 1/10 inch in diameter and separated from each other by distances of about 1/5 inch. The picture screen $e$ carries a scenic design. In the particular embodiment illustrated a further observing or viewing screen $f$ is shown which could, for instance, be the shade of a standard lamp or the background for an advertising sign or decorative mural, upon which the apparatus throws a confused image of both sources, further confused with one another.

FIGURE 2 shows the two cylinders in side perspective, without the various screens. The cylindrical surfaces and flat ends are provided with zones of many different colours, randomly located and of differing areas. The cylinders are preferably constructed to rotate at differing rates.

In the embodiment illustrated in FIGURE 3 a multi-coloured light source such as one of the cylinders depicted in FIGURE 1 with an associated undiffused incandescent light source, as shown an electric lamp, generally denoted as $a$, is mounted behind a turntable $j$. A second cylinder $a$ is mounted behind a second turntable $j'$ and the two turntables are connected by means of driving belts $k$ to a third relatively small turntable or wheel which is driven from beneath by a motor, not shown. On all three turntables light deviating lens elements $l$ are mounted in such a way and in such a position, on edge on the turntables, that light from the cylinders $a$ will pass through the lenses one or more times and reach a screen $f$ which, for decorative purposes, has been shown divided into four sections representing four panels of a translucent screen. Such panels may, for instance, be arranged to represent a series of windows. Rotation of the turntables brings the various lenses successively into a position for transmitting the multi-coloured light produced by rotation of the cylinders $a$. The lenses are each mounted, however, in such a way that no distinct image of the light source is shown on the screen, but a confused one as hereinbefore noted.

In the embodiment illustrated in FIGURE 4 a multi-coloured light source of the same general type formed by a cylindrical drum $a$ is mounted to rotate between a light deviating lens $l$ and a light deviating concave mirror $m$. Light transmitted by the lens directly from cylinder $a$ presents a more or less circular area of confused illumination on a screen $f$ and this is accompanied by an elongated area of similarly confused illumination resulting from reflection onto the same screen, of light from the same source, by the concave mirror. If desired the device may be further modified by so positioning the mirror and the lens with respect to each other that light reflected by the mirror is also transmitted by the lens on its way to the screen. Thus the concave mirror can be mounted in a substantially horizontal position below the lens and may also contain a quantity of water on which an ornament may be allowed to float, thus modifying the character of the display produced.

In the embodiment shown in FIGURE 5 a multi-coloured light source $a$ of the aforesaid type is caused to rotate relatively close to a light deviating concave mirror $m$ (but beyond the focal point thereof). Reflected light is projected at a viewing surface $n$ which in this case may be the wall of a building or other shaped structure adapted for the purpose.

In the embodiment illustrated in FIGURE 6 there is shown in plan an arrangement similar in principle to that of FIGURE 3. In this case the undiffused incandescent light sources each consists of a cluster $p$ of different coloured pea bulbs mounted so as to illuminate a screen $f$ shown divided into sections to represent windows, through light deviating lenses such as $l$ mounted on a rotating turntable $j$. Masks $o$ are provided to cover the spaces between the various lenses so as to prevent the passage of direct light. The turntable is rotated by means of a motor, not shown. Further reflecting mirrors and/or prisms and the like may also be incorporated.

What is claimed is:

1. Apparatus for producing a rich variety of abstract artistic colour displays composed of variegated configurations of light moving against a generally dark background on a semi-opaque translucent viewing screen without betraying to the observer the mode of movement of working parts therein, which apparatus comprises a plurality of distinct differently coloured areas of clear transparent material confining at least one undiffused incandescent light source, a semi-opaque translucent stationary sheet viewing screen spaced sufficiently apart from said areas and said source to prevent identifiable impressions thereof being observed on said screen, and a plurality of light deviating elements inherently capable of focussing circumferentially spaced apart on at least one motor driven turntable to rotate with respect to said screen and with respect to said source about at least one turntable axis in loci such that the relative positions of said elements, screen and source constantly change in a smoothly continuous manner, and such that light from more than one said area is simultaneously transmitted by more than one said element to the screen, said elements being substantially always out of focus in relation to said screen, areas and source, when transmitting light to said screen, and said source being external to all said loci.

2. Apparatus according to claim 1 wherein said light deviating elements comprise lenses, a plurality thereof being mounted on each of a number of said turntables to rotate at different rates.

3. Apparatus according to claim 1 wherein said coloured areas and said source are constituted by at least one cluster of miniature electric lamps known as pea bulbs.

4. Apparatus according to claim 1 wherein said coloured areas rotate independently of the turntables.

5. Method of producing a rich variety of abstract artistic colour displays composed of variegated configurations of light moving against a generally dark background on a semi-opaque translucent viewing screen without betraying to the observer the mode of movement of working parts therein, which method comprises illuminating a plurality of distinct differently coloured areas of clear transparent material by confining therein at least one undiffused incandescent light source, spacing a semi-opaque translucent stationary sheet viewing screen sufficiently apart from said areas and said source to prevent identifiable impressions thereof being observed on said screen, mounting a plurality of light deviating elements inherently capable of focussing circumferentially spaced apart on at least one motor driven turntable, rotating said elements with respect to said screen and with respect to said source about at least one turntable axis in loci such that the relative positions of said elements, screen and source constantly change in a smoothly continuous manner, and such that light from more than one said area is simultaneously transmitted by more than one said element to the screen, said elements being substantially always out of focus in relation to said screen, areas and source, when transmitting light to said screen, and said source being external to all said loci.

References Cited in the file of this patent

UNITED STATES PATENTS

| 1,498,064 | Apfelbaum | June 17, 1924 |
| 2,036,032 | Fioravanti | Mar. 31, 1936 |
| 2,196,423 | Musaphia | Apr. 9, 1940 |
| 2,279,182 | Snyder | Apr. 7, 1942 |
| 2,281,790 | Newhall | May 5, 1942 |
| 2,293,106 | Bourdakoff | Aug. 18, 1942 |
| 2,529,107 | Shapiro | Nov. 7, 1950 |
| 2,776,179 | Kemp et al. | Jan. 1, 1957 |
| 2,915,843 | Pabst et al. | Dec. 8, 1959 |
| 3,030,856 | Jordan | Apr. 24, 1962 |

FOREIGN PATENTS

| 11,642/33 | Australia | Mar. 5, 1934 |
| 453,832 | Italy | Dec. 19, 1949 |